United States Patent Office 2,975,182
Patented Mar. 14, 1961

2,975,182
1-(AROYLALKYL)-4-(HETEROCYCLYL) PIPERAZINES

Paul A. J. Janssen, Antwerpse Steenweg 16, Vosselaar, near Turnhout, Belgium

No Drawing. Filed Nov. 16, 1959, Ser. No. 853,020

6 Claims. (Cl. 260—268)

The present invention relates to a new group of heterocyclylpiperazine derivatives and more particularly to 1-(aroylalkyl)-4-(heterocyclyl)piperazines of the general structural formula

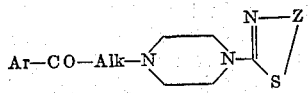

wherein Alk is a lower alkylene radical; Ar is a member of the class consisting of phenyl, tolyl, methoxyphenyl, halophenly, and thienyl radicals; and Z is a member of the class consisting of —CH=CH—, —C(CH$_3$)=CH—, —N=CH—, and —N=C(CH$_3$)— radicals.

The ring systems which are represented by the

group thus are 2-thiazolyl, 2-(1,3,4-thiadiazolyl), 5-(1, 2,4-thiadiazolyl) radicals and methyl derivatives thereof.

The radical Alk in the foregoing structural formula is a bivalent saturated hydrocarbon radical and preferably one containing two to four carbon atoms such as ethylene, trimethylene, propylene, tetramethylene, and butylene. The halogen can be fluorine, chlorine, bromine, or iodine.

The compounds of the invention can be advantageously prepared by the condensation of a compound of the structural formula Ar—CO—Alk-Halogen with an appropriately selected 1-(heterocyclyl)piperazine. The condensation can be carried out in an inert solvent such as an aromatic hydrocarbon (e.g. benzene, toluene, xylene), a lower alkanol (e.g. methanol, ethanol, propanol, butanol) and a lower alkanone (e.g. acetone, butanone, pentanone). In certain cases the reaction can be usefully accelerated by elevated temperatures.

An alternate procedure for the preparation of these compounds employs the condensation of a 1-aroylalkyl-piperazine of the structural formula

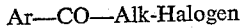

with an appropriately selected haloheterocycle.

The compounds of this invention can also be prepared by reacting a haloalkanonitrile of the formula NC—Alk-Halogen with 1-(heterocyclyl)piperazine. The 4-(heterocyclyl)-1-piperazinealkanonitrile of the formula

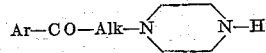

thus obtained is heated with an arylmagnesium halide of the formula

Ar—Mg-Halogen under Grignard conditions, followed by acid hydrolysis of the adduct.

Another method for the preparation of these compounds employs the acid hydrolysis of the appropriate 4-heterocyclyl-1-piperazinealkanonitrile to form the acid which is then converted into the acyl halide of the general structural formula

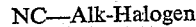

A Friedel-Crafts reaction using the appropriate aromatic hydrocarbon, Ar—H, results in the formation of the product.

The compounds of this invention are depressants of the central nervous system. They are hypnotics as judged by the loss of the righting reflex in mice, barbiturate potentiators, and analgesics.

The organic bases of this invention form nontoxic, acid-addition salts with a variety of organic and inorganic acids. Such salts are formed with such acids as sulfuric, phosphoric, hydrochloric, hydrobromic, hydroiodic, sulfamic, citric, lactic, maleic, malic, succinic, tartaric, cinnamic, acetic, benzoic, gluconic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzene-sulfonate, ethyl toluenesulfonate, ethylene chlorohydrin, propylene chlorohydrin, allyl bromide, methallyl bromide and crotyl bromide.

The compounds which constitute this invention and the methods for their preparation will appear more fully from a consideration of the following examples, which are given for the purpose of illustration only and are not to be construed as limiting the invention in spirit or in scope. In these examples quantities are indicated as parts by weight.

Example 1

A mixture of 4.55 parts of γ-chlorobutyrophenone and 8.5 parts of 1-(2-thiazolyl)piperazine in 80 parts of diisopropyl ether is heated on an oil bath at 110° C. for 1 hour. The precipitate is removed by filtration and the filtrate is diluted by one quarter of its volume with petroleum ether. The solid precipitated is collected on a filter, dissolved in diisopropyl ether, boiled with activated charcoal and filtered again. Upon cooling, 1-(γ-benzoylpropyl)-4-(2-thiazolyl)piperazine precipitates. After filtering and drying, the pale yellow amorphous powder melts at about 61.5–64° C.

Example 2

To a suspension of 350 parts of aluminum chloride in 1800 parts of carbon disulfide are added 92 parts of toluene with stirring and cooling. While the temperature is maintained at about 10° C., 154 parts of δ-chlorovaleryl chloride are added. After the addition is completed, the cooling bath is removed and the stirring is continued for 2 hours. The mixture is then poured into ice water, dried over anhydrous sodium sulfate, and filtered. The filtrate is concentrated under reduced pressure and the residue is distilled to yield δ-chloro-4-methylvalerophenone.

By substituting 5.5 parts of δ-chloro-4-methylvalerophenone for γ-chlorobutyrophenone in Example 1, 1-(δ-benzoylbutyl)-4-(2-ethiazolyl)piperazine is obtained. The compound has the structural formula:

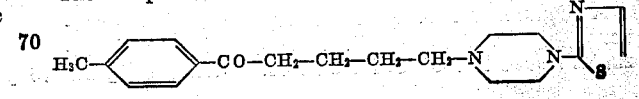

Example 3

To a boiling solution of 144 parts of anhydrous piperazine in 320 parts of hexanol are added 74 parts of 2-chloro-4-methylthiazole. The mixture is refluxed for 2 hours, allowed to stand overnight at room temperature and filtered. The filtrate is evaporated. The residue is distilled under vacuum to yield 1-(4-methyl-2-thiazolyl) piperazine boiling at about 137–138° C. at 3 mm. pressure.

A mixture of 4.55 parts of γ-chlorobutyrophenone and 9.2 parts of 1-[2-(4-methyl)thiazolyl]piperazine is heated at 105° C. for 8 hours, cooled and extracted with benzene. The benzene extract is washed with water, dried, treated with activated charcoal and filtered. After evaporation of the benzene, the residue is dissolved in diisopropyl ether. Upon chilling an oil separates and the ethereal solution is then decanted and saved. The oil is dissolved in ether. Hydrogen chloride gas is passed through the solution. The solid precipitated is collected on a filter, recrystallized from boiling 2-propanol, and dried to yield the impure dihydrochloride of 1-(γ-benzoylpropyl)-4-[2-(4-methyl)-thiazolyl]piperazine.

After diluting the decanted ethereal solution saved from above with diethyl ether, hydrogen chloride gas is passed through the solution. The solid precipitated is collected on a filter, recrystallized from boiling 2-propanol, and dried under vacuum to yield a second impure fraction of the dihydrochloride.

The two impure fractions are dissolved in a 10:3 mixture of ethanol and methanol. Hydrogen chloride gas is passed through the solution. After crystallization is completed, the mixture is heated and the solid is filtered from the hot solution. After drying, 1-(γ-benzoylpropyl)-4-[2-(4-methyl)thiazolyl]piperazine dihydrochloride melts at about 186–188.6° C. The compound has the structural formula

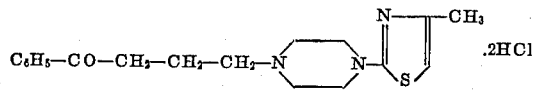

Example 4

A mixture of 5 parts of γ-chloro-4-fluorobutyrophenone and 8.5 parts of 1-(2-thiazolyl)piperazine is heated on an oil bath at 110° C. for 2 hours, boiled with 80 parts of diisopropyl ether, and filtered. To the filtrate is added one-fourth of its volume of petroleum ether. The solution is chilled at −20° C. and the solid which precipitates is collected on a filter and then recrystallized for diisopropyl ether. After drying, the pale yellow powder of 1-[γ-(4-fluorobenzoyl)propyl]-4 - (2-thiazolyl)piperazine melts at about 74.5–76.5° C.

Example 5

Equimolar substitution of γ-iodobutyryl iodide for δ-chlorovaleryl chloride in the first paragraph of Example 2 yields γ-chloro-4-iodobutyrophenone. By substituting this product for γ-chlorobutyrophenone in Example 1, 1-[γ-(4-iodobenzoyl)propyl]-4-(2-thiazolyl)piperazine is obtained. The compound has the structural formula

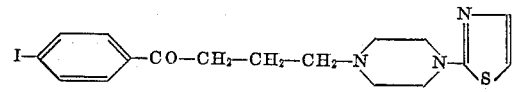

Example 6

A mixture of 23 parts of piperazine, 14 parts of 2-chloro-5-methylthiazole, and 80 parts of hexanol is refluxed for 5 hours, cooled and filtered. The filtrate is washed with butanol and evaporated under vacuum. The residue is distilled to yield 1-(5-methyl-2-thiazolyl) piperazine boiling at about 154–156° C. at 6–7 mm. pressure and melting at about 37.5–42° C.

A mixture of 5 parts of γ-chloro-4-fluoro-butyrophenone and 92.2 parts of 1-[2-(5-methyl)thiazolyl]piperazine is heated at 105° C. for 8 hours. After cooling the mixture is extracted with benzene. The benzene extract is washed with water, dried over sodium sulfate, filtered, treated with activated charcoal and filtered again. The benzene is evaporated and the remaining residue is dissolved in diisopropyl ether. After cooling an oil separates which is removed. The remaining liquor is further cooled to yield 1-[γ-(4-fluorobenzoyl)propyl]-4-[2-(5-methyl)thiazolyl]piperazine as white amorphous powder melting at about 73–75.2° C.

Example 7

A mixture of 4.4 parts of γ-chloro-4-fluorobutyrophenone and 8 parts of 1-[2-(5-methyl)thiazolyl]piperazine is heated for 8 hours at 100–110° C. After cooling, the mixture is partitioned between benzene and water and the layers are separated. The water layer is extracted with benzene. The combined benzene solutions are dried over sodium sulfate and then evaporated. The residue is recrystallized from diisopropyl ether by chilling at −20° C. to yield 1-[γ-(4-fluorobenzoyl)propyl]-4-[2-(5-methyl)thiazolyl]piperazine. The yellow amorphous powder of this compound melts at about 62–64.5° C.

By equimolar substitution of β-chloro-4-fluoropropiophenone for γ-chloro-4-fluorobutyrophenone in the procedure of the above paragraph, 1-[β-(4-fluorobenzoyl)-ethyl]-4-[2-(5-methyl)thiazolyl]piperazine is obtained. The compound has the structural formula

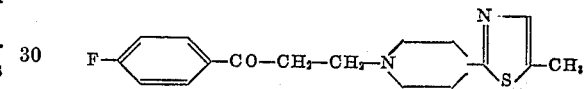

Example 8

A mixture of 6.2 parts of γ-chloro-4-methoxy-butyrophenone and 9 parts of 1-(2-thiazolyl)piperazine is heated at 110° C. for 5 hours. The mixture is partitioned between water and ether and the layers are separated. After drying the ether layer, hydrogen chloride gas is passed through the solution. The solid precipitated is crystallized from a 7:3 mixture of 2-propanol and ethanol to yield 1-[γ-(4-methoxybenzoyl)propyl]-4-(2-thiazolyl)piperazine dihydrochloride melting at about 122.4° C.

Example 9

A mixture of 6.2 parts of γ-chloro-4-methoxybutyrophenone and 9.2 parts of 1-[2-(4-methyl)thiazolyl]-piperazine is heated on an oil bath for 8 hours and cooled. The mixture is partitioned between benzene and water and the layers are separated. The benzene layer is dried over potassium carbonate, decolorized with activated charcoal, and evaporated. The oily residue is dissolved in diisopropyl ether and chilled to yield an oil. The solution is decanted from the oil which is saved. After further cooling of the solution, the crude base of 1-[γ-(4-methoxybenzoyl)propyl] - 4-[2-(4-methyl)thiazolyl]-piperazine melting at about 62.5–72° C. is precipitated.

The base, the mother-liquor and first oily precipitate are dissolved in diisopropyl ether. Hydrogen chloride gas is passed through the mixture. The solid precipitated is collected on a filter and crystallized from a 2:5 mixture of ethanol and 2-propanol by chilling at −20° C. to yield 1-[γ-(4-methoxybenzoyl)propyl] - 4-[2-(4 - methyl)thiazolyl]piperazine dihydrochloride. The pale yellow powder of this compound melts at about 187–201° C.

Example 10

A mixture of 4.8 parts of 2-(γ-chlorobutyryl)thiophene and 9 parts of 1-(2-thiazolyl)piperazine is heated on an oil bath at 100° C. for 90 minutes. The mixture is then boiled with benzene and water. The water layer is extracted with benzene. The combined benzene layers are dried over sodium sulfate, filtered, decolorized with activated charcoal, and the benzene evaporated. The residue is dissolved in diisopropyl ether and chilled to precipitate 1-[γ-(2-thenoyl)propyl]-4-(2-thiazolyl)piperazine melting at about 52.2–54.6° C. The compound has the structural formula

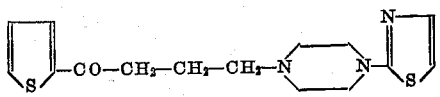

Example 11

A mixture of 4.8 parts of 2-(γ-chlorobutryl)thiophene and 9.2 parts of 1-[2-(4-methyl)thiazolyl]piperazine is heated at 105° C. for 8 hours and cooled. The mixture is extracted with benzene. The benzene layer is washed with water, dried over sodium sulfate, decolorized with activated charcoal, and the benzene evaporated. The residue is dissolved in 2-propanol and filtered. A 2:3 mixture of 2-propanol and diisopropyl ether is added to the filtrate. Hydrogen chloride gas is passed through the mixture and the solid precipitated is collected on a filter. After crystallization from ethanol, the amorphous powder of 1-(2-thenoyl)propyl-4-[2-(4-methyl)thiazolyl]-piperazine dihydrochloride melts at about 163–176° C.

Example 12

A mixture of 21 parts of 2-bromo-1,3,4-thiadiazole, 38.7 parts of piperazine, and 80 parts of pentanol is refluxed for 2 hours, cooled, and filtered. The filter cake is washed with pentanol. The combined filtrates are evaporated to yield 1-[2-(1,3,4-thiadiazolyl)]piperazine as a dark brown viscous oil. The oil is suitable for the reactions of the subsequent examples.

The 1-[5-(1,2,4-thiadiazolyl)]piperazine isomer of the above compound is prepared by substituting 5-bromo-1,2,4-thiadiazolyl in the foregoing reaction.

Example 13

A mixture of 42 parts of 2-bromo-5-methylthiadiazole, 74 parts of piperazine, and 240 parts of hexanol is refluxed for 20 minutes, cooled at 0° C., and filtered. The filtrate is evaporated to a volume of 100–150 parts and diisopropyl ether is added to the residue. Crystallization occurs on standing overnight. The crystals are collected on a filter and dried to yield 1-[2-(5-methyl-1,3,4-thiadiazolyl)]piperazine melting at about 70–73° C. It has the structural formula

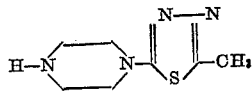

The 1-[5-(3-methyl-1,2,4-thiadiazolyl)]piperazine isomer of this compound is obtained by substituting 5-bromo-3-methyl-1,2,4-thiadiazole in the foregoing procedure.

Example 14

A mixture of 4.5 parts of γ-chlorobutyrophenone and 10.5 parts of 1-[2-(1,3,4-thiadiazolyl)]piperazine is heated at 100–110° C. for 8 hours. The mixture is cooled and partitioned between benzene and water. The water layer is separated and extracted with benzene. The organic solution is dried over sodium sulfate and evaporated. The oily residue is dissolved in diisopropyl ether. The mixture is filtered and the filtrate is chilled to −15° C. At this temperature an oil forms which is removed by decantation. The filtrate is cooled again to give a precipitate which is collected on a filter and dried to yield the pale yellow powder of 1-(γ-benzoylpropyl)-4-[2-(1,3,4-thiadiazolyl)]piperazine melting at about 59–64° C. The compound has the structural formula

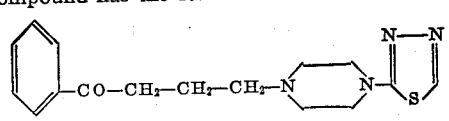

Example 15

To an agitated boiling solution of 69 parts of piperazine in 160 parts of toluene are added in the course of 1 hour, 36.4 parts of γ-chlorobutyrophenone in 40 parts of anhydrous toluene. The agitation and refluxing of the mixture is continued for 2 hours. The mixture is cooled and filtered. The filtrate is evaporated. The residue is fractionated under vacuum to yield 1-(γ-benzoylpropyl)piperazine boiling at about 179.5–180° C. at 2 mm. pressure.

A mixture of 7 parts of 1-(γ-benzoylpropyl)-piperazine, 2.7 parts of 5-bromo-3-methyl-1,2,4-thiadiazole and 40 parts of 2-propanol is refluxed for 6 hours with stirring. The mixture is cooled and filtered. The filtrate is evaporated. The residue is extracted with boiling diisopropyl ether. The ethereal extract is chilled at −20° C. The resulting precipitate is recrystallized from diisopropyl ether to yield 1-(γ-benzoylpropyl)-[5-(3-methyl-1,2,4-thiadiazolyl)]piperazine. The white amorphous powder melts at about 78–79° C. and has the formula

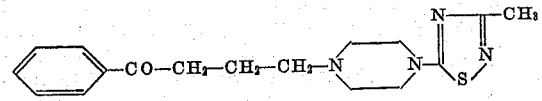

Example 16

A mixture of 4.55 parts of γ-chlorobutyrophenone and 9.2 parts of 1-[2-(5-methyl-1,3,4-thiadiazolyl)]piperazine is heated at 100–110° C. for 90 minutes, cooled, and partitioned between water and benzene. The water layer is separated and then extracted with benzene. The combined organic layers are dried over sodium sulfate. The solvent is removed by distillation and the residue is dissolved in diisopropyl ether. Crystallization is induced by chilling overnight at −20° C. The precipitate is collected on a filter, dried, and extracted twice with boiling diisopropyl ether. From the combined hot extracts there precipitates the crude 1-(γ-benzoylpropyl)-4-[2-(5-methyl-1,3,4-thiadiazolyl)]piperazine. After recrystallization from normal hexane the compound melts at about 98–100.2° C. and has the structural formula

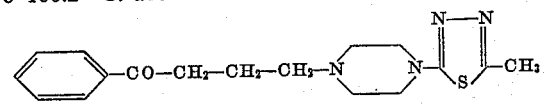

Example 17

A mixture of 3.8 parts of γ-chloro-4-fluorobutyrophenone and 7.2 parts of 1-[2-(5-methyl-1,3,4-thiadiazolyl)]piperazine is heated for 8 hours at 100–110° C., and cooled. The mixture is partitioned between water and benzene. The water layer is separated and extracted with benzene. The combined organic layers are dried over sodium sulfate and the solvent is removed by distillation. The residue is recrystallized from diisopropyl ether to yield 1-[γ-(4-fluorobenzoyl)propyl]-4-[2-(5-methyl-1,3,4-thiadiazolyl)]piperazine melting at about 105–106° C. The compound has the structural formula

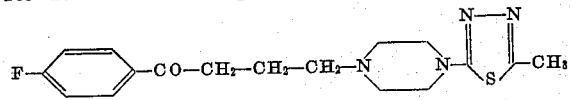

By substituting 4.4 parts of γ-chloro-4-fluorobutyrophenone and 9.4 parts of 1-[2-(1,3,4-thiadiazolyl)]-piperazine in the above procedure, 1-[γ-(4-fluorobenzoyl)propyl]-4-[2-(1,3,4-thiadiazolyl)]piperazine, melting at about 94.6–95.8° C., is obtained. The compound has the structural formula

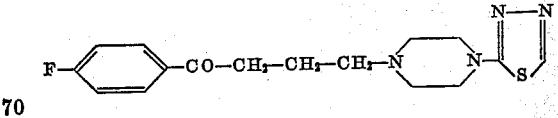

Example 18

A mixture of 6.15 parts of γ-chloro-4-methoxy-butyrophenone and 9.2 parts of 1-[2-(5-methyl-1,3,4-thiadiazolyl)]piperazine is heated for 2 hours at 100–110° C., cooled, and partitioned between benzene and water. The water layer is separated and extracted with benzene. The combined organic extracts are dried over sodium sulfate and evaporated. The residue is extracted with boiling diisopropyl ether. From the hot extract there precipitates the crude 1-[γ-(4-methoxybenzoyl)-propyl]-4-[2-(5-methyl-1,3,4-thiadiazolyl)]piperazine. After recrystallization the compound melts at about 111.5–112.5° C. and has the structural formula

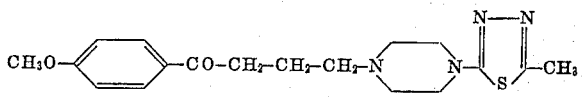

*Example 19*

A mixture of 4.8 parts of 2-(γ-chlorobutyryl)-thiophene and 9.2 parts of 1-[2-(5-methyl-1,3,4-thiadiazolyl)]piperazine is heated for 2 hours at 100–110° C., cooled, and then partitioned between benzene and water. The water layer is separated and extracted with benzene. The organic layer is dried over sodium sulfate and evaporated. The residue is exhaustively extracted with boiling diisopropyl ether. The extracts are chilled at 0° C. The precipitate which forms is recrystallized from n-heptane to yield 1-[γ-(2-thenoyl)propyl]-4-[2-(5-methyl-1,3,4-thiadiazolyl)]piperazine melting at about 83.6–85.6° C. The compound has the structural formula

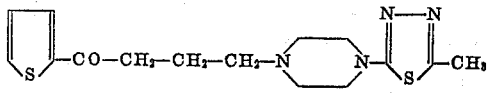

What is claimed is:

1. A compound of the structural formula

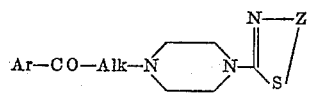

wherein Alk is a lower alkylene radical; Ar is a member of the class consisting of phenyl, tolyl, methoxyphenyl, halophenyl, and thienyl radicals; and Z is a member of the class consisting of —CH=CH—, —C(CH$_3$)=CH—, —N=CH—, and —N=C(CH$_3$)— radicals.

2. 1 - (γ-benzoylpropyl) - 4 - [2-(5-methyl)thiazolyl]piperazine.

3. A compound of the formula 4. 1-[γ-(4-fluorobenzoyl)propyl] - 4 - (2-thiazolyl)piperazine.

5. A compound of the formula 6. 1-[γ-(4-fluorobenzoyl)propyl]-4-[2 - (4 - methyl)thiazolyl]piperazine.

No references cited.